United States Patent [19]
Camp et al.

[11] Patent Number: 5,421,125
[45] Date of Patent: Jun. 6, 1995

[54] SLIDING WINDOW ASSEMBLY

[75] Inventors: Charles C. Camp, Chillicothe; John R. Kaveney, East Peoria, both of Ill.

[73] Assignee: Caterpillar Inc., Peoria, Ill.

[21] Appl. No.: 223,191

[22] Filed: Apr. 5, 1994

[51] Int. Cl.⁶ .............................................. E06B 3/34
[52] U.S. Cl. ...................................... 49/404; 49/406; 49/479.1; 52/207
[58] Field of Search ............... 49/404, 501, 479.1, 49/406, 489.1, 413, 475.1; 52/207

[56] References Cited

U.S. PATENT DOCUMENTS

| | | | |
|---|---|---|---|
| 2,769,657 | 11/1956 | Frie | 296/47 |
| 3,077,010 | 2/1963 | Philbrick, Jr. | 49/489.1 X |
| 3,383,800 | 5/1968 | Sturtevant | 49/428 |
| 3,490,176 | 1/1970 | Danois | 49/413 X |
| 3,808,742 | 5/1974 | Ehert et al. | 49/413 |
| 4,042,004 | 8/1977 | Kwan | 49/413 X |
| 4,158,272 | 6/1979 | Riegelman | 49/431 |
| 4,553,354 | 11/1985 | Barbero | 49/431 |
| 4,757,643 | 7/1988 | Boots | 49/489.1 |
| 4,763,446 | 8/1988 | Kelly | 52/207 X |
| 4,785,583 | 11/1988 | Kawagoe | 49/404 |
| 4,799,332 | 1/1989 | Haas | 49/406 X |

*Primary Examiner*—Philip C. Kannan
*Attorney, Agent, or Firm*—Calvin E. Glastetter

[57] ABSTRACT

Sliding windows are used in machine cabs to allow exchange of air between the atmosphere and the interior of the cab. When a panel is moveable a seal must be provided to prevent the ingress of water into the cab. The subject window assembly includes a sliding panel having four radiused corners and also a seal which is positioned in a side portion of the sliding panel to prevent the ingress of water. The seal is continuous around the corners and extends therefrom to contact a stationary panel. This arrangement of components provides a sliding window which provides a seal which prevent ingress of water into the cab.

2 Claims, 2 Drawing Sheets

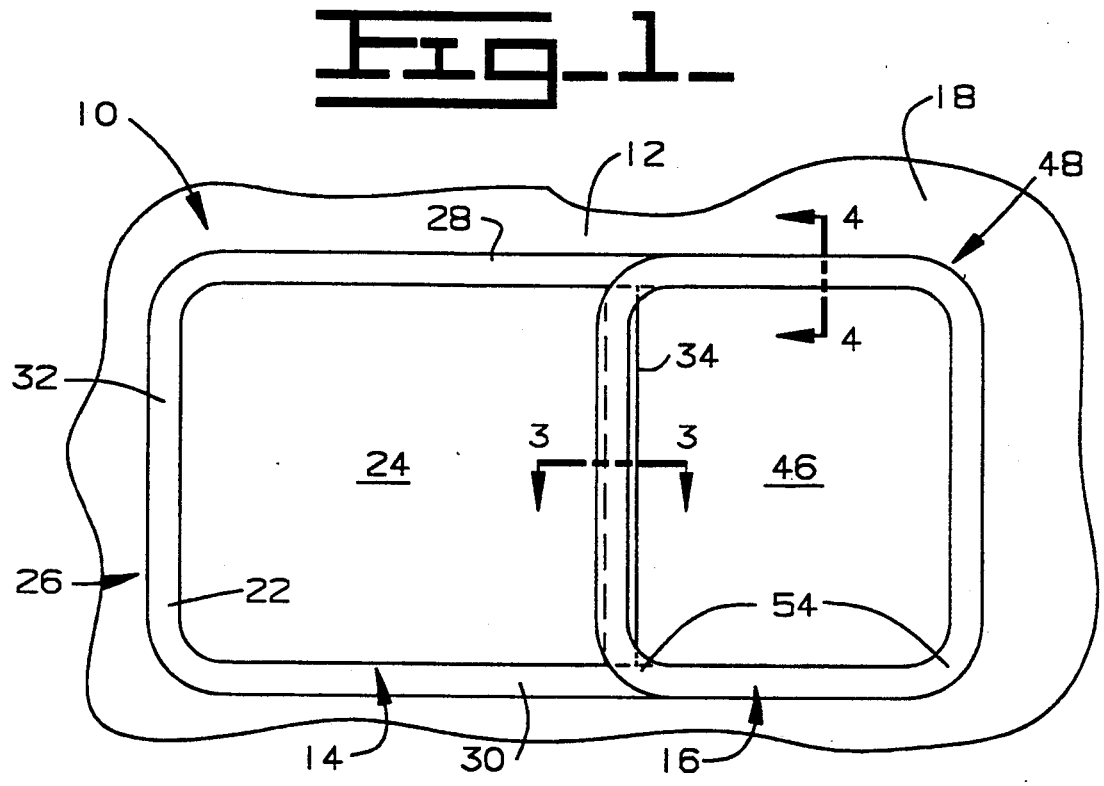
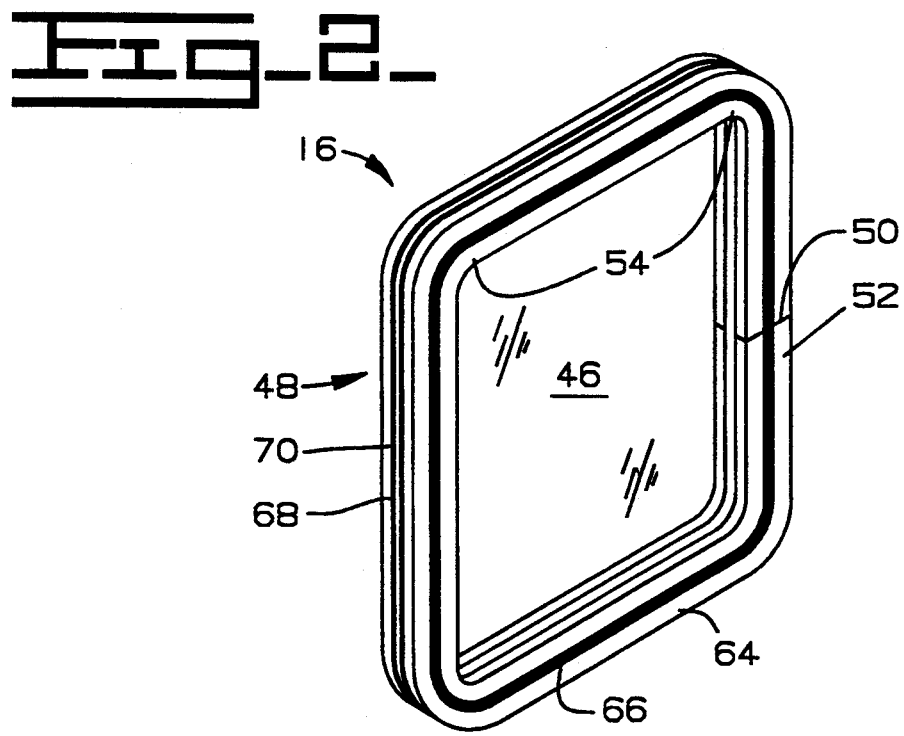

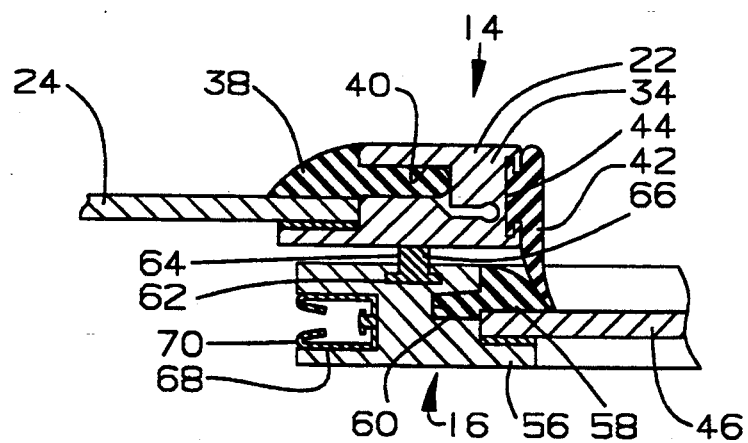
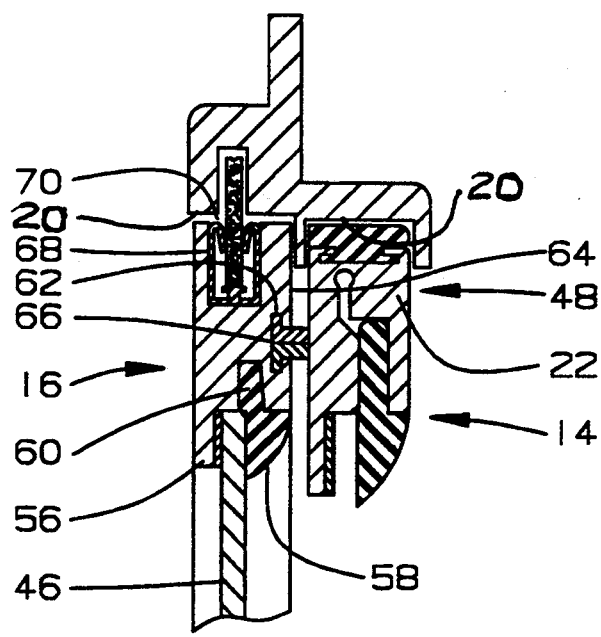

SLIDING WINDOW ASSEMBLY

TECHNICAL FIELD

This invention relates generally to a window assembly and more particularly to a sliding window having a continuous window frame having four radiused corners.

BACKGROUND ART

Sliding windows are commonly used to allow the exchange of air between the atmosphere and the inside of an enclosed cab of a machine. One example of such use involves positioning a window in a cab wall and sliding a portion of the window to provide an opening. One of the problems associated with sliding windows is that, during pressure washing or while raining, water will ingress into the cab around the sealing material at the joined corners.

The present invention is directed to overcoming the problem as set forth above.

DISCLOSURE OF THE INVENTION

In one aspect of the present invention a window assembly is adapted to be mounted in an opening in a wall. The window includes a generally rectangular unitary mounting frame having a plurality of parallel glazing channels. A stationary panel is mounted within one of the glazing channels. A sliding panel is mounted within another one of the glazing channels. A perimeter frame is positioned around the periphery of the sliding panel. The perimeter frame has four radiused corners and a continuous seal groove formed within a side wall.

The present invention provides a window assembly having four radiused corners and a continuous seal groove formed within a sidewall. A seal is positioned within the seal groove to prevent ingress of water around the sliding panel.

BRIEF DESCRIPTION OF THE DRAWINGS

FIG. 1, is a side view of a window assembly of the present invention;

FIG. 2, is an isometric view of a sliding glass panel;

FIG. 3, is a sectional view taken along line 3—3 in FIG. 1; and

FIG. 4, is a sectional view taken along line 4—4 in FIG. 1.

BEST MODE FOR CARRYING OUT THE INVENTION

Referring to the drawings, a window assembly 10 includes a generally rectangular unitary mounting frame 12, a stationary panel 14 and a sliding panel 16. The window assembly 10 is positioned within a cab wall 18. The unitary mounting frame 12 has a plurality of glazing channels 20. The glazing channels 20 are positioned in a parallel relationship. The channels 20 open inwardly of the plane of the mounting frame 12.

The stationary panel 14 includes a perimeter frame 22 and a glass panel 24. The perimeter frame 22 includes a c-shaped bar 26 which conforms to the shape of the perimeter frame 22. The c-shaped bar 26 has an upper portion 28, a lower portion 30 and a side portion 32. A vertical bar 34 is connected between the upper portion 28 and the lower portion 30 to form a second side. The glass panel 24 is positioned within the frame 22. A seal 38 which is positioned within a groove 40 of the frame 22 and extends between the frame 22 and the glass panel 24. The seal 38 maintains the glass panel 24 within the frame 22 and also prevents the ingress of water into the cab. The vertical bar 34 includes a flap seal 42 positioned within a groove 44. The flap seal 42 extends from the vertical bar 34 to the sliding panel 16 to prevent ingress of water into the cab.

The sliding panel 16 includes a glass panel 46 and a perimeter frame 48. The perimeter frame 48 extends around the glass panel 46, having the first end 50 and the second end 52 in abutting relationship. The perimeter frame 48 has four radiused corners 54. The frame 48 has an inner shoulder 56 positioned for abutment of the glass panel 46. A seal 58 is positioned within a inwardly facing groove 60 of the frame 48. The seal 58 extends from the groove 60 to maintain the glass panel 46 within the frame 48 and also prevent ingress of water. The frame 48 has a groove 62 formed within a side 64 of the frame 48. A seal 66 is positioned within the groove 62 and extends therefrom for contacting the stationary panel 14 to prevent ingress of water into the cab. The seal 66 has abutting ends and is continuous around the radiused corners. The sliding panel 16 includes a seal groove 68 in the outer periphery of the frame 48. A seal 70 is positioned within the groove 68. The seal 70 has an outwardly facing opening for receiving a portion of the mounting frame 12. The seal 70 prevents the ingress of water into the cab and also provides a track for the sliding panel 16.

INDUSTRIAL APPLICABILITY

In the use of the present invention a window assembly 10 is mounted in a cab wall 18. The window assembly has a sliding panel 16 to allow for exchange of air between the atmosphere and the cab. A stationary panel 14 is positioned with a mounting frame 12 in the cab wall. The stationary panel 14 includes a perimeter frame 22 having a vertical bar 34 which formes a side portion. The sliding panel 16 is moveable from an open position to a closed position. The sliding panel includes a perimeter frame 48 which contains the glass panel 46. The frame 48 has four radiused corners 54. The frame 48 includes a seal 66 which is positioned within the side portion 64. When the sliding panel 16 is in the closed position the seal 66 will contact the vertical bar 34 and the frame 12 to prevent the ingress of water into the cab.

In view of the forgoing, it is readily apparent that the structure of the present invention provides a sliding window which prevents the ingress of water into the cab. With the sliding panel 16 having four radiused corners and a continuous seal around the corners the ingress of water will be prevented.

Other aspects, objects and advantages of this invention can be obtained from a study of the drawing, the disclosure and the appended claims.

We claim:

1. A window assembly which is adapted to be mounted within an opening in a wall, the window assembly having a generally rectangular unitary mounting frame having a plurality of parallel glazing channels opening inwardly of the plane of the frame, a stationary panel is mounted within one of the glazing channels and a sliding panel is mounted within another one of the glazing channels, comprising:

A perimeter frame positioned around the periphery of the sliding panel, the perimeter frame having four radiused corners and a continuous seal groove formed within a side portion.

2. The window assembly of claim 1, including a seal positioned within the seal groove of the window frame.

* * * * *